United States Patent Office 3,503,976
Patented Mar. 31, 1970

3,503,976
PRODUCTION OF PYRIMIDINES BEARING HALOGEN AS SUBSTITUENT IN THE 5-POSITION
Franz Reicheneder, Karl-Ludwig Hock, and August Amann, Ludwigshafen (Rhine), Germany, assignors to Badische Anilin- & Soda-Fabrik Aktiengesellschaft, Ludwigshafen (Rhine), Germany
No Drawing. Filed Apr. 14, 1967, Ser. No. 630,829
Claims priority, application Germany, Apr. 20, 1966, 1,670,069, 1,670,070, 1,670,072
Int. Cl. C07d 51/38
U.S. Cl. 260—256.4
14 Claims

ABSTRACT OF THE DISCLOSURE

The production of pyrimidines bearing halogen as substituents in the 5-position and other substituents in the 2- and 4-positions in which in a first stage acrylic acid derivatives or propionic acid derivatives are reacted with amidines to form 2-substituted 4-hydroxy-5-halopyrimidines, then by a known method in a second stage the 4-hydroxy-5-halopyrimidines thus obtained are reacted with phosgene, halides of trivalent or pentavalent phosphorus, oxychlorides or oxybromides of pentavalent phosphorus, tetravalent or hexavalent sulfur to form 2-substituted 4,5-dihalopyrimidines, and in a third stage these 4,5-dihalopyrimidines are reacted with ammonia, amines, heterocycles which still contain a hydrogen atom on nitrogen, hydrazines or their corresponding alkali metal compounds or alkaline earth metal compounds, and the new 5-halopyrimidines bearing in the 2-position an aryl radical and bearing in the 4-position an amino radical, substituted amino radical, hydrazino radical, substituted hydrazino radical or a heterocyclic radical attached via a nitrogen atom. The new and known products of the process are analgesic and antiphlogistic and may be used as intermediates for the production of pharmaceuticals and plant protection agents.

---

The invention relates to the production of pyrimidines bearing halogen as substituent in the 5-position and other substituents in the 2- and 4-positions and to new substances of this type.

Methods for the production of pyrimidines which bear halogen as a substituent in the 5-position and other substituents in the 2- and 4-positions are already known. Thus for example in Helvetica Chimica Acta 5 (1922) 267 et seq. the reaction of methyleneasparagine with a hypobromite is described to form 4-oxo-5-bromo-6-carboxypyrimidine from which 4-chloro-5-bromopyrimidine is formed by appropriate further synthesis steps; 2-methyl-4-oxo(chloro)-5-bromopyrimidine and 2-phenyl-4-chloro-5-bromopyrimidine are obtained in an analogous manner. Methods for the production of 5-halopyrimidines which are unsubstituted in the 2-position and which bear halogen, amino or hydrazino groups as substituents in the 4-position are described in the Journal of the Chemical Society 1955, 3478 et seq. All these methods start from difficulty accessible starting materials and give only a small number of 5-halopyrimidines bearing substituents in the 2- and 4-positions in unsatisfactory yields.

It is an object of this invention to provide a new method for the production in good yields of pyrimidines which bear halogen as a substituent in the 5-position and which bear other substituents in the 2- and 4-positions in a three-step process from easily accessible starting materials.

Another object of this invention is the first step of the said three-step process, namely the reaction of acrylic acid derivatives or propionic acid derivatives with amidines to form 2-substituted 4-hydroxy-5-halopyrimidines.

A further object of this invention is to provide new 5-halopyrimidines bearing an aryl radical as substituent in the 2-position and an amino group, hydrazino group, substituted amino group, substituted hydrazino group or a heterocyclic radical attached via a nitrogen atom as substituent in the 4-position.

In accordance with this invention these and other objects are achieved and 5-halopyrimidines having the formula:

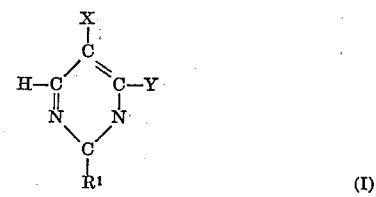

(I)

in which $R^1$ denotes a hydrogen atom, an alkyl group, a cycloalkyl group, an aralkyl group, an aryl group, or an aryl group bearing substituents which are inert under the reaction conditions, X denotes a halogen atom, and Y denotes (a) the radical

in which $R^3$ and $R^4$ denote hydrogen atoms, alkyl groups, cycloalkyl groups, aralkyl groups, aryl groups, or aryl groups bearing substituents which are inert under the reaction conditions and $R^3$ and $R^4$ together may form an alkylene radical having two to six carbon atoms in which one methylene group may be replaced by an oxygen atom, a sulfur atom or by one of the groups

or

in which $R^5$ denotes an alkyl group, cycloalkyl group or the phenyl radical, or (b) the radical

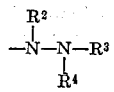

in which $R^3$ and $R^4$ have the above meanings and $R^2$ denotes a hydrogen atom or a methyl group, are obtained by reacting, in a first stage, an acrylic acid derivative having the formula:

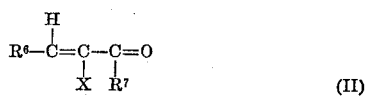

(II)

in which X has the above meaning, $R^6$ denotes a halogen atom or an alkoxy group and $R^7$ denotes an alkoxy group or the amino group

in which $R^8$ and $R^9$ denote hydrogen atoms or lower alkyl groups, or a propionic acid derivative having the formula:

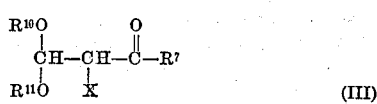

(III)

in which X and R⁷ have the above meanings and R¹⁰ and R¹¹ denote alkyl groups with an amidine having the formula:

in which R¹ has the meaning given above, or with a salt thereof from which the said amidine is liberated by adding a base, at a temperature of from 30° to 120° C., preferably from 40° to 70° C., in the presence of a base, reacting in a second stage the resultant 5-halo-4-hydroxypyrimidine having the formula:

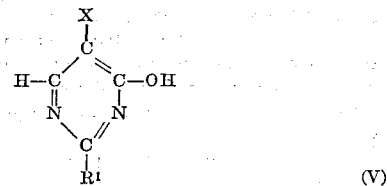

in which X and R¹ have the above meanings, with phosgene, a chloride, bromide or iodide of trivalent or pentavalent phosphorus, an oxychloride or oxybromide of pentavalent phosphorus or of tetravalent or hexavalent sulfur at a temperature of from 30° to 200° C. and, reacting in a third stage, the resultant 4,5-dihalopyrimidine having the formula:

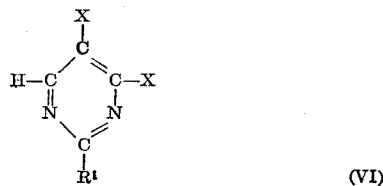

in which R¹ and X have the above meanings, with a compound which has the general formula:

$$H-Y \qquad (VII)$$

in which Y has the above meaning, in the presence or absence of a base, or with an alkali metal salt or an alkaline earth metal salt of the compound HY at temperatures of from 30° to 200° C.

Cyclization of the acrylic acid derivative or propionic acid derivative with amidines is a novel and essential feature of the process according to the invention.

The first stage of the process may be represented for example for the reaction of ethyl 2,3-dichloroacrylate with benzamidine by the following equation:

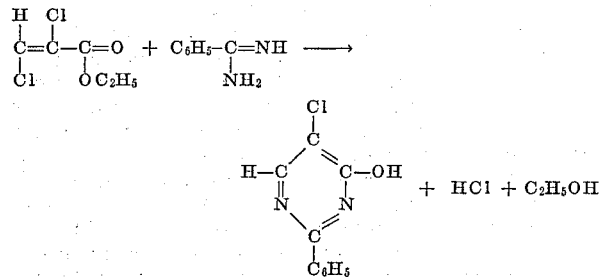

Preferred acrylic acid derivatives and propionic acid derivatives having the Formulas II and III are those in which the radical R⁷ denotes an alkoxy group having one to four carbon atoms or the amino group $$-N-R^8$$
$$\quad\ |$$
$$\quad\ R^9$$

in which R⁸ and R⁹ denote hydrogen atoms or alkyl groups having one to four carbon atoms, R¹⁰ and R¹¹ denote alkyl groups having one to four carbon atoms, X and R⁶ denote chlorine atoms, bromine atoms or iodine atoms, and R⁶ may also denote an alkoxy radical having one to four carbon atoms.

Preferred amidines having the Formula IV are those in which the radical R¹ denotes a hydrogen atom, an alkyl radical having one to six carbon atoms, a cycloalkyl radical having five to twelve carbon atoms, an aralkyl radical having seven to nine carbon atoms or an aryl radical having six to twelve carbon atoms. The aryl radical in the preferred amidines may bear one to three substituents which are inert under the reaction conditions, such as chlorine, bromine, iodine, fluorine, nitro groups, alkyl radicals, alkoxy radicals, alkylmercapto radicals, preferably having one to four carbon atoms in each case, or secondary amino groups. The salts of the amidines with inorganic or organic acids, for example the chlorides, sulfates, nitrates or acetates, may be used instead of the amidines themselves.

The first step of the process is carried out in the presence of a base. For example the oxides and hydroxides of the alkali metals and alkaline earth metals, particularly of sodium, potassium, calcium and barium, may be used as bases. Other suitable bases are tertiary amines, such as dimethylaniline, diethylaniline, trimethylamine or pyridine. It is preferred to use alkali alcoholates of lower alkanols and the alkali metal amides. The bases combine with the hydrogen chloride liberated and are used as a rule in equivalent amounts. Larger amounts may however also be used, particularly when the amidine to be reacted has first to be liberated from its salt.

The first stage of the process may be carried out in the presence of solvents. Aliphatic, cycloaliphatic or aromatic hydrocarbons or chlorohydrocarbons, ethers, such as dioxane, tetrahydrofuran or dibutyl ether, lower carboxylic amides, such as dimethylformamide, acetamide, N-methylpyrrolidone or tetramethylurea, or tetramethylenesulfone are suitable as solvents. Alkanols, especially those having one to four carbon atoms, are particularly suitable solvents.

The first step of the process may be carried out for example by placing the reactants in a reactor, if desired in a solvent, and then slowly adding the base. It is also possible to place the base in the reactor and to add the starting materials, or to bring the single components together continuously. It is advantageous to use the reactants in stoichiometric amounts. It is however also possible to use one or other of the reactant in excess, for example in an excess of up to 20%.

When the reaction is over, the reaction mixture, if desired after any solvent has been removed, is usually introduced into water and the pyrimidine is precipitated by adding acid and then separated. The pyrimidine may be recrystallized from water or an organic solvent to purify it.

The second stage of the process is advantageously carried out with phosphorus trichloride, phosphorus pentachloride, phosphorus oxychloride, the corresponding bromine or iodine compounds, thionyl chloride, sulfuryl chloride, phosgene or substances which react like phosgene under the reaction conditions, for example oxalyl chloride. The reaction may however also be carried out with mixtures of the said halogenating agents. It is advantageous to use mixtures which consist solely of chlorides or solely of bromides.

The amount of halogenating agent used in relation to the amount of pyrimidine to be halogenated is not critical. Thus, for example, an amount of halogenating agent which is equivalent to the starting material may be added. It is advantageous to use the halogenating agent in excess, for example up to ten times the equivalent amount. If the halogenating agent is in liquid phase under the reaction conditions, it may take over the function of a solvent or suspension medium. The second step of the process may however also be carried out in the presence of an inert solvent. Examples of such solvents are halogenated hydrocarbons, such as carbon tetrachloride, tetrachloroethane and trichloroethylene, or aromatic hydrocarbons, such as benzene, toluene or xylene, or halogenated aromatic hydrocarbons, such as chlorobenzene, o-dichlorobenzene or m-dichlorobenzene.

Tertiary amines, such as dimethylaniline, diethylaniline, tributylamine or pyridine, may be added to accelerate the halogenation in the second stage of the process. They are advantageously added in amounts of 0.5 to 15% by weight with reference to the pyrimidine to be halogenated. Preferred catalysts which accelerate the halogenation are N,N-disubstituted carboxylic amides, such as dimethylformamide, tetramethylurea or N-methylpyrrolidone. They are preferably added in amounts of 1 to 10% by weight with reference to the pyrimidine to be halogenated.

The reaction temperature in the second stage may be from 30° to 200° C., the range of 50° to 160° C. being preferred.

To carry out the second stage of the process, the pyrimidine to be halogenated may be placed in a reactor, if desired together with the solvent or suspension agent and the catalyst, and the halogenating agent then added. The desired reaction temperature may be set up by heating. Since heat is evolved during the reaction, it may be necessary to cool the reaction mixture to maintain the reaction temperature. After a reaction period of fifteen minutes to four hours, the reaction mixture is cooled and the 4,5-dihalopyrimidine which has crystallized out is separated, for example by filtration or centrifuging. When an excess of halogenating agent is used, for example an excess of phosphorus trichloride, phosphorus oxychloride or thionyl chloride, this may be removed by distillation at subatmospheric pressure. The residue is then taken up with ice-water or poured onto ice. The desired pyrimidine thus separates out and may easily be separated for example by filtration or centrifuging. The substances are usually already very pure. They may be further purified by recrystallization from an organic solvent, for example methanol, ethanol, isopropanol, ethyl acetate, acetonitrile, acetone, nitromethane, toluene, cyclohexane, dimethyl sulfoxide or tetramethylenesulfone.

The third stage of the process may be represented by the following equation, given for the production of 2-phenyl-4-amino-5-chloropyrimidine by reaction of 2-phenyl-4,5-dichloropyrimidine with ammonia:

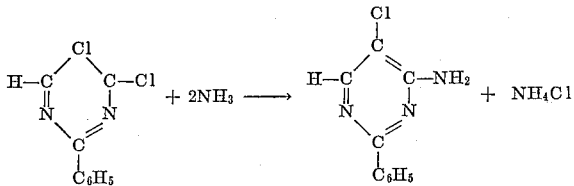

Preferred 4,5-dihalopyrimidines are those in which X in the Formula VI denotes chlorine, bromine or iodine and $R^1$ denotes a hydrogen atom, an alkyl radical having one to six carbon atoms, a cycloalkyl radical having five to twelve carbon atoms, an aralkyl radical having seven to nine carbon atoms or an aryl radical having six to twelve carbon atoms. The aryl radical in the preferred starting pyrimidines may bear one to three substituents which are inert under the reaction conditions, such as chlorine, bromine, iodine, nitro groups, alkyl radicals, alkoxy radicals or alkylmercapto radicals, each having preferably one to four carbon atoms.

Starting materials of the general Formula VII which are suitable for the third stage of the process are ammonia, primary amines and secondary amines. In this case the radical Y denotes the group

In the preferred amines the radicals $R^3$ and $R^4$ denote hydrogen atoms, alkyl groups having one to eighteen, particularly one to six, carbon atoms, cycloalkyl groups having six to twelve carbon atoms, aralkyl radicals having seven to nine carbon atoms or aryl radicals having six to eight carbon atoms, which may bear one to three substituents, such as chlorine atoms, bromine atoms, alkoxy groups, alkylmercapto groups or dialkylamino groups each having one to four carbon atoms in the alkyl group.

The radicals $R^3$ and $R^4$ may together form an alkylene radical having two to six, particularly four to six, carbon atoms, and one methylene group of the alkylene radical may be replaced by an oxygen atom, sulfur atom or one of the groups

or

in which $R^5$ is preferably an alkyl radical having one to four carbon atoms. For example, the following amines may be reacted, in addition to ammonia: methylamine, isopropylamine, 2-ethylhexylamine, cyclohexylamine, cyclooctylamine, cyclododecylamine, benzylamine, aniline, p-chloroaniline, p-dimethylaminoaniline, m-toluidine, dimethylamine, diphenylamine, N-methylaniline, ethylenimine, hexamethylenimine, morpholine, thiomorpholine, thiomorpholine oxide, thiomorpholine dioxide, piperidine, 1-oxo-4-aza-2,6-dimethylcyclohexane, pyrrolidine or N-monomethylpiperazine.

Hydrazine and substituted hydrazines may also be reacted in the third stage of the process. They may be represented by the general Formula VII in which Y denotes the radical

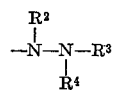

in which $R^3$ and $R^4$ have the same meanings as for the amines above and $R^2$ preferably denotes a hydrogen atom or a methyl radical. When $R^2$ and $R^3$ denote hydrogen atoms, $R^4$ may denote a phenyl radical. Specific examples of preferred hydrazines are: hydrazine, methylhydrazine, methylhydrazines which are substituted symmetrically or asymmetrically (advantageously used in the form of their hydrates or of aqueous solutions), and phenylhydrazine.

In the third stage of the process according to the invention, the oxides, hydroxides and carbonates of the alkali metals and alkaline earth metals, particularly of sodium, potassium, calcium and barium, may be used as bases which will bind hydrogen halide but will not react with the 4,5-dihalopyrimidines having the Formula VI. Tertiary amines, such as dimethylaniline, diethylaniline, tributylamine and pyridine, are further suitable bases. As a rule the amount of base used is such that hydrogen halide forming in the reaction is neutralized. It is also possible however to use an excess of base.

The third stage of the process may be carried out in the presence or absence of a solvent. Alkanols, preferably having one to six carbon atoms, such as methanol, ethanol, propanol or isobutanol, ethers, such as dibutyl ether, dioxane or tetrahydrofuran, N,N-disubstituted carboxylic amides, such as dimethyl formamide, diethyl formamide, dimethyl acetamide, N-methylpyrrolidone or tetramethylurea, or tetramethylenesulfone may be used as solvents.

In carrying out the third stage of the process the starting materials are if possible used in the molar ratio of 1:1. An excess of the compound having the Formula VII may however be used, in which case the use of a base may not be necessary.

If a readily volatile compound is being reacted, it is advantageous to carry out the process at superatmospheric pressure. The pressure may vary within wide limits. The pressure to be used will depend on the reaction temperature used. As a rule pressures up to about 100 atmospheres are adequate.

The compounds of the Formula I which can be prepared by the process have remarkable pharmacological properties. They act to relieve pain and to prevent inflammation at the same time. Particularly valuable new compounds I have the formula:

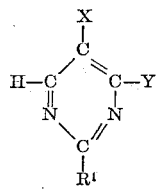

in which $R^1$ denotes an aryl radical having six to twelve, particularly six to eight, carbon atoms, X denotes a chlorine atom or a bromine atom and Y denotes the radical

in which $R^3$ and $R^4$ each denotes a hydrogen atom, an alkyl group having one to six carbon atoms, a cycloalkyl group having six to twelve carbon atoms, an aryl group having six to eight carbon atoms, or $R^3$ and $R^4$ taken together denote an alkylene radical having four to six carbon atoms one of which may be replaced by an oxygen atom, or denotes the radical

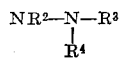

in which $R^2$ denotes a hydrogen atom or a methyl group and $R^3$ and $R^4$ have the meanings given above. Thus 2-phenyl-4-amino-5-chloro(bromo)-pyrimidine and 2-phenyl-4-hydrazino-5-chloro(bromo)-pyrimidine exhibit a better antiphlogistic effect against inflammation artificially induced in rats by carrageenin solution than pyramidone when applied perorally in amounts of 10 to 100 mg. per kg. of rat.

The products which can be prepared by the process according to this invention are also valuable intermediates for the production of pharmaceuticals and plant protection agents.

The invention is further illustrated in the following examples. Examples 1 to 11 illustrate the first stage of the process, Examples 12 to 20 the second stage of the process and Examples 21 to 28 the third stage of the process. The parts specified in the examples are by weight.

EXAMPLES OF THE FIRST STAGE OF THE PROCESS

Example 1

A solution of 32.4 parts of sodium methylate in 100 parts of methanol is added to a solution of 33.8 parts of ethyl 2,3-dichloroacrylate and 31.2 parts of benzamidine hydrochloride in 200 parts of methanol slowly at 65° C. while stirring and the mixture is heated under reflux for another five hours and cooled; the methanol is distilled off under subatmospheric pressure, the residue is dissolved in water and the 2-phenyl-4-hydroxy-5-chloropyrimidine is precipitated with glacial acetic acid. After the compound has been recrystallized from toluene, 35 parts thereof is obtained having a melting point of 247° to 249° C.

If 51.6 parts of ethyl 2,3-dibromoacrylate instead of ethyl 2,3-dichloroacrylate is used, 42 parts of 2-phenyl-4-hydroxy-5-bromopyrimidine having a melting point of 258° to 260° C. is obtained.

Example 2

A solution of 33.6 parts of potassium hydroxide in 250 parts of methanol is slowly added at 65° C. to a solution of 33.8 parts of ethyl 2,3-dichloroacrylate and 31.2 parts of benzamidine hydrochloride in 200 parts of methanol. The product is worked up as described in Example 1. 22 parts of 2-phenyl-4-hydroxy-5-chloropyrimidine is obtained having a melting point of 247° to 249° C.

Example 3

A solution of 16.2 parts of sodium methylate in 50 parts of methanol is allowed to flow slowly at 65° C. while stirring into a solution of 15.4 parts of 2,3-dichloroacrylic N-methylamide and 15.6 parts of benzamidine hydrochloride in 150 parts of methanol. The product is then worked up as described in Example 1. 8 parts of 2-phenyl-4-hydroxy-5-chloropyrimidine is obtained having a melting point of 247° to 249° C.

Example 4

A solution of 16.2 parts of sodium methylate in 50 parts of methanol is slowly added at 65° C. while stirring to a solution of 16.8 parts of 2,3-dichloroacrylic-N,N-dimethylamide and 15.6 parts of benzamidine hydrochloride in 150 parts of methanol. The product is worked up as described in Example 1. 11 parts of 2-phenyl-4-hydroxy-5-chloropyrimidine is obtained having a melting point of 247° to 249° C.

Example 5

A mixture of 17.8 parts of ethyl 2-chloro-3-ethoxy acrylate, 15.6 parts of benzamidine hydrochloride and 10.8 parts of sodium methylate is heated under reflux for five hours. The product is then worked up as described in Example 1. 7 parts of 2-phenyl-4-hydroxy-5-chloropyrimidine is obtained having a melting point of 247° to 249° C.

Example 6

A solution of 10.8 parts of sodium methylate in 50 parts of methanol is slowly added at 65° C. while stirring to a solution of 22.4 parts of ethyl 2-chloro-3,3-diethoxypropionate and 15.6 parts of benzamidine hydrochloride in 200 parts of methanol. The whole is then worked up as described in Example 1. 12 parts of 2-phenyl-4-hydroxy-5-chloropyrimidine having a melting point of 247° to 249° C. is obtained.

Example 7

A solution of 32.4 parts of sodium methylate in 100 parts of methanol is allowed to flow slowly at 65° C. into a solution of 33.8 parts of ethyl 2,3-dichloroacrylate and 34 parts of p-toluamidine hydrochloride in 200 parts of methanol. The whole is then worked up as described in Example 1. 26 parts of 2-p-tolyl-4-hydroxy-5-chloropyrimidine is obtained having a melting point of 266° C.

Example 8

A solution of 16.2 parts of sodium methylate in 50 parts of methanol is slowly added at 65° C. to a solution of 16.9 parts of ethyl 2.3-dichloroacrylate and 19 parts of p-chlorobenzamidine hydrochloride in 150 parts of methanol. The whole is then worked up as described in Example 1. 16 parts of 2-p-chlorophenyl-4-hydroxy-5-chloropyrimidine having a melting point of about 325° C. is obtained.

Example 9

A solution of 16.2 parts of sodium methylate in 50 parts of methanol is allowed to flow slowly at 75° C. into a solution of 16.9 parts of ethyl 2,3-dichloroacrylate and 20 parts of p-nitrobenzamidine hydrochloride in 200 parts of ethanol. The whole is then worked up as described in Example 1. 15 parts of 2-p-nitrophenyl-4-hydroxy-5-chloropyrimidine is obtained having a melting point above 300° C.

When m-nitrobenzamidine hydrochloride is used instead of p-nitrobenzamidine hydrochloride, 2-m-nitrophenyl-4-hydroxy-5-chloropyrimidine having a melting point of 272° C. is obtained.

Example 10

A solution of 32.4 parts of sodium methylate in 100 parts of methanol is added slowly at 65° C. to a solution of 33.8 parts of ethyl 2-3-dichloroacrylate and 19 parts of acetamidine hydrochloride in 150 parts of methanol. The whole is then worked up as described in Example 1. 5 parts of 2-methyl-4-hydroxy-5-chloropyrimidine is obtained having a melting point of 228° C.

Example 11

A solution of 32.4 parts of sodium methylate in 100 parts of methanol is slowly added at 65° C. while stirring to a solution of 33.8 parts of ethyl 2,3-dichloroacrylate and 32.4 parts of cyclohexylamidine hydrochloride in 200 parts of methanol and the mixture is heated under reflux for another five hours and cooled. The methanol is distilled off at subatmospheric pressure, the residue is dissolved in water and the 2-cyclohexyl-4-hydroxy-5-chloropyrimidine is precipitated with glacial acetic acid. 26 parts of this compound having a melting point of 198° C. is obtained after recrystallization from alcohol.

EXAMPLES OF THE SECOND STAGE OF THE PROCESS

Example 12

A mixture of 20 parts of 2-phenyl-4-hydroxy-5-chloropyrimidine, 3 parts of dimethylaniline and 250 parts of phosphorus oxychloride is heated under reflux for four hours. The mixture is cooled and poured onto ice. The precipitate is filtered off and washed several times with water. After recrystallization from ethanol, 17 parts of 2 - phenyl - 4,5 - dichloropyrimidine having a melting point of 127° C. is obtained.

Example 13

2 parts of dimethylformamide is added to a suspension of 20 parts of 2-phenyl-4-hydroxy-5-chloropyrimidine in 300 parts of toluene and the mixture is heated to 60° C. while passing in phosgene. A clear solution is obtained after half an hour. The excess of phosgene is expelled with nitrogen and the solution is filtered and cooled. 2-phenyl - 4,5 - dichloropyrimidine crystallizes out in pure form. A second fraction is obtained by concentrating the mother liquor and this may be purified by recrystallization from methanol. The total yield is 20 parts of 2-phenyl-4,5-dichloropyrimidine having a melting point of 127° C.

If 25 parts of 2-phenyl-4-hydroxy-5-bromopyrimidine is used instead of 2-phenyl-4-hydroxy-5-chloropyrimidine, 23 parts of 2-phenyl-4-chloro-5-bromopyrimidine having a melting point of 134° to 136° C. is obtained.

The following 4,5-dichloropyrimidines having the general formula:

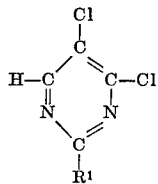

in which $R^1$ has the meaning indicated, may be prepared in an analogous manner:

| Example | R¹ | M.P., °C. | B.P., °C. | Yield, percent |
|---|---|---|---|---|
| 14 | Methyl | | 185 | 80 |
| 15 | p-Nitrophenyl | 158 | | 85 |
| 16 | m-Nitrophenyl | 172 | | 83 |
| 17 | p-Chlorophenyl | 146 | | 85 |
| 18 | Cyclohexyl | | 110 | 82 |
| 19 | p-Tolyl | 153 | (0.3 mm. Hg) | 80 |

Example 20

A mixture of 20 parts of 2-phenyl-4-hydroxy-5-chloropyrimidine and 45 parts of phosphorus oxybromide is heated slowly to 155° C. Two hours later the whole is allowed to cool, decomposed with ice-water and worked up as described in Example 12. 20 parts of 2-phenyl-4-bromo-5-chloropyrimidine is obtained having a melting point of 138° C.

EXAMPLES OF THE THIRD STAGE OF THE PROCESS

Example 21

A mixture of 10 parts of 2-phenyl-4,5-dichloropyrimidine and 50 parts of isobutylamine is heated under reflux for four hours. Excess isobutylamine is then distilled off in a water-jet vacuum and the residue is fractionated. 10 parts of 2 - phenyl - 4 - isobutylamino - 5 - chloropyrimidine is obtained having a boiling point of 140° C. at 0.2 mm. Hg and a melting point of 44° C.

The following compounds are obtained in an analogous way:

| | Amine | Yield, Percent | M.P., °C. |
|---|---|---|---|
| Example: | | | |
| 22 | 2-phenyl-4-anilino-5-chloropyrimidine | 68 | 106 |
| 23 | 2-phenyl-4-piperidino-5-chloropyrimidine | 80 | 88 |
| 24 | 2-phenyl-4-morpholino-5-chloropyrimidine | 85 | 79 |

Example 25

22.5 parts of 2-phenyl-4,5-dichloropyrimidine, 150 parts of ethanol and 30 parts of concentrated ammonia are heated for six hours at 120° C. in an autoclave. The whole is then poured with water, filtered and recrystallized from benzene. 15 parts of 2-phenyl-4-amino-5-chloropyrimidine having a melting point of 139° C. is obtained.

If 27 parts of 2-phenyl-4-chloro-5-bromopyrimidine is used instead of 2-phenyl-4,5-dichloropyrimidine, 19 parts of 2 -phenyl - 4 - amino - 5 - bromopyrimidine having a melting point of 139° to 141° C. is obtained.

Example 26

A solution of 22.5 parts of 2-phenyl-4,5-dichloropyrimidine and 10 parts of hydrazine hydrate in 500 parts of n-propanol is heated under reflux for two hours and cooled. The whole is poured into water, the precipitate being filtered off and washed with water. After recrystallization from benzene, 16 parts of 2-phenyl-4-hydrazino-5-chloropyrimidine having a melting point of 199° C. is obtained.

If 27 parts of 2-phenyl-4-chloro-5-bromopyrimidine is used instead of 2-phenyl-4,5-dichloropyrimidine, 21 parts of 2 - phenyl - 4 - hydrazino - 5 - bromopyrimidine having a melting point of 200° C. is obtained.

Example 27

23.1 parts of 2-cyclohexyl-4,5-dichloropyrimidine, 150 parts of ethanol and 30 parts of concentrated ammonia are heated at 120° C. in an autoclave for six hours and then poured into water, filtered and recrystallized from benzene. 16 parts of 2-cyclohexyl-4-amino-5-chloropyrimidine having a melting point of 124° C. is obtained.

Example 28

13.5 parts of 2-p-nitrophenyl-4,5-dichloropyrimidine and 10 parts of cyclohexylamine are reacted in 150 parts of ethanol analogously to Example 21. 14.3 parts of 2-p-nitrophenyl-4-cyclohexylamino-5-chloropyrimidine is obtained having a melting point of 205° C.

We claim:
1. Pyrimidines having the formula:

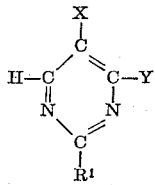

in which $R^1$ denotes phenyl, tolyl, chlorophenyl or nitrophenyl, X denotes a chlorine or bromine atom, and Y denotes the radical

in which $R^3$ and $R^4$ each denotes a hydrogen atom, an alkyl group having one to six carbon atoms, a cycloalkyl group having six to twelve carbon atoms, an aryl group having six to eight carbon atoms or, together with the nitrogen bearing $R^3$ and $R^4$, piperidino or morpholino, or the radical

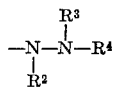

in which $R^2$ denotes a hydrogen atom or a methyl group and $R^3$ and $R^4$ have the said meaning.

2. 2-phenyl-4-amino-5-chloropyrimidine.
3. 2-phenyl-4-amino-5-bromopyrimidine.
4. 2-phenyl-4-hydrazino-5-chloropyrimidine.
5. 2-phenyl-4-hydrazino-5-bromopyrimidine.
6. A process for preparing 5-halo-4-hydroxypyrimidines having the formula:

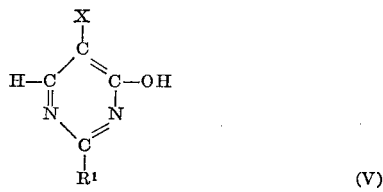

in which $R^1$ denotes a hydrogen atom, an alkyl radical, a cycloalkyl radical, an aralkyl radical, an aryl radical or an aryl radical having a substituent which is inert under the reaction conditions and X denotes a halogen atom, which comprises reacting an acrylic acid derivative having the formula:

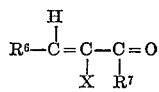

in which X has the above meaning, $R^6$ denotes a halogen atom or an alkoxy group and $R^7$ denotes an alkoxy group or the amino group

in which $R^8$ and $R^9$ denote hydrogen atoms or lower alkali groups or a propionic acid derivative having the formula:

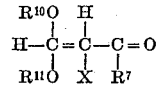

in which X and $R^7$ have the above meanings and $R^{10}$ and $R^{11}$ denote alkyl groups, with an amidine having the formula:

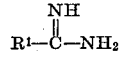

in which $R^1$ has the above meaning or with a salt thereof which will liberate the said amidine upon addition of a base, at a temperature of from 30° to 120° C.

7. A process as claimed in claim 6 carried out at from 40° to 70° C.
8. A process as claimed in claim 6 carried out in the presence of a base.
9. A process as claimed in claim 6 carried out in the presence of an organic solvent.
10. Pyrimidines as claimed in claim 1 wherein Y represents amino.
11. Pyrimidines as claimed in claim 1 wherein Y represents hydrazino.
12. Pyrimidines as claimed in claim 1 wherein Y represents morpholino.
13. Pyrimidines as claimed in claim 1 wherein Y represents piperidino.
14. Pyrimidines as claimed in claim 1 wherein Y represents cyclohexylamino.

References Cited

UNITED STATES PATENTS

| | | | |
|---|---|---|---|
| 2,377,395 | 6/1945 | Andersag et al. | 260—256.4 |
| 2,963,478 | 12/1960 | Weinstock | 260—251.5 |

OTHER REFERENCES

Brown, The Pyrimidines, Interscience, 1962, pp. 40, 162–8, 187–201.

Vander PLAS et al., Tetrahedron Letters, No. 31, pp. 2093–8, 1964.

ALEX MAZEL, Primary Examiner
R. J. GALLAGHER, Assistant Examiner

U.S. Cl. X.R.

260—243, 247.5; 424—248, 251

UNITED STATES PATENT OFFICE
CERTIFICATE OF CORRECTION

Patent No. 3,503,976     Dated March 31, 1970

Inventor(s) Franz Reicheneder et al

It is certified that error appears in the above-identified patent and that said Letters Patent are hereby corrected as shown below:

Column 2, formula I, that portion of the formula reading 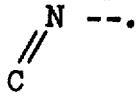 should read -- 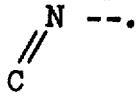 --.

Column 3, line 67, that portion of the formula reading " -N-R⁸ " should read -- -N-R⁹ --.

Column 5, line 46, that portion of the formula reading 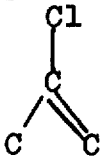 should read -- 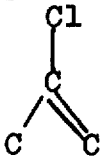 --.

Column 7, line 35, that portion of the formula reading "NR²" should read -- -NR² --.

SIGNED AND SEALED

OCT 27 1970

(SEAL)
Attest:

Edward M. Fletcher, Jr.
Attesting Officer

WILLIAM E. SCHUYLER, JR.
Commissioner of Patents